(12) United States Patent
Yacoub et al.

(10) Patent No.: US 8,623,305 B2
(45) Date of Patent: Jan. 7, 2014

(54) METHOD FOR CONTROLLING AN INJECTION DEVICE FOR FEEDING AN AMMONIA-RELEASING REDUCING AGENT INTO AN EXHAUST-GAS PURIFICATION SYSTEM OF AN INTERNAL COMBUSTION ENGINE

(71) Applicant: Ford Global Technologies, LLC, Dearborn, MI (US)

(72) Inventors: Yasser Mohamed sayed Yacoub, Cologne (DE); Mario Balenovic, Waalre (NL); Jan Harmsen, Simpelveld (NL)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 13/649,908

(22) Filed: Oct. 11, 2012

(65) Prior Publication Data
US 2013/0101485 A1  Apr. 25, 2013

(30) Foreign Application Priority Data
Oct. 24, 2011 (DE) .......................... 10 2011 085 108

(51) Int. Cl.
*B01D 53/94* (2006.01)
*F01N 3/18* (2006.01)
*F01N 3/20* (2006.01)
*G05B 1/00* (2006.01)
*G05B 21/00* (2006.01)

(52) U.S. Cl.
USPC .................... 423/213.2; 423/239.1; 422/105; 422/110; 422/111; 60/299; 60/301; 700/283

(58) Field of Classification Search
USPC ............ 422/105, 110, 111; 423/213.2, 239.1; 60/299, 301; 700/283
See application file for complete search history.

(56) References Cited

U.S. PATENT DOCUMENTS

2011/0060465 A1* 3/2011 Cho ............................. 700/271
2011/0311420 A1* 12/2011 Perrin et al. ............... 423/213.2
2013/0017136 A1* 1/2013 Hirota et al. .................. 423/212

FOREIGN PATENT DOCUMENTS

DE 102009044778 A1 3/2011
DE 102010025382 A1 3/2011
WO 2011138277 A1 11/2011

* cited by examiner

*Primary Examiner* — Timothy Vanoy
(74) *Attorney, Agent, or Firm* — Julia Voutyras; Alleman Hall McCoy Russell & Tuttle LLP

(57) ABSTRACT

The present disclosure relates to a method for controlling an injection device for feeding an ammonia-releasing reducing agent into an exhaust-gas purification system of an internal combustion engine for the purpose of reducing the nitrogen oxide emissions, wherein the exhaust-gas purification system comprises at least one SCR catalytic converter with n cells which are arranged in series in the exhaust-gas throughflow direction and in which ammonia can be stored.

20 Claims, 3 Drawing Sheets

METHOD FOR CONTROLLING AN INJECTION DEVICE FOR FEEDING AN AMMONIA-RELEASING REDUCING AGENT INTO AN EXHAUST-GAS PURIFICATION SYSTEM OF AN INTERNAL COMBUSTION ENGINE

CROSS REFERENCE TO RELATED APPLICATIONS

The present application claims priority to German Patent Application No. 102011085108.9, filed on Oct. 24, 2011, the entire contents of which are hereby incorporated by reference for all purposes.

FIELD

The present disclosure relates to a method for controlling an injection device for feeding an ammonia-releasing reducing agent into an exhaust-gas purification system of an internal combustion engine for the purpose of reducing nitrogen oxide emissions, wherein the exhaust-gas purification system comprises at least one SCR catalytic converter.

BACKGROUND AND SUMMARY

Various exhaust-gas purification systems are known. These include systems which reduce the nitrogen oxide content in exhaust gases using externally infed reducing agents. The reducing agent is generally injected into the exhaust-gas flow by means of an injection device. A so-called SCR catalytic converter arranged downstream of the injection device then effects the actual conversion. SCR (selective catalytic reduction) refers to the technique of the selective catalytic reduction of nitrogen oxides in exhaust gases of combustion plants, refuse combustion plants, gas turbines, industrial plants and engines. The chemical reaction in the SCR catalytic converter is selective, that is to say preferentially the nitrogen oxides (NO, $NO_2$) are reduced whereas undesired secondary reactions (such as for example the oxidation of sulfur dioxide to form sulfur trioxide) are substantially suppressed. SCR catalytic converters are often used in combination with soot particle filters and oxidation catalytic converters.

A reducing agent is required for the abovementioned reduction reaction, with ammonia ($NH_3$) typically being used as reducing agent. Here, the ammonia required is generally used not directly, that is to say in pure form, but rather is used in the form of a 32.5% aqueous urea solution, referred to uniformly in the industry as AdBlue®. The composition is regulated in DIN 70070. The reason why the ammonia required is not carried on board in pure form is the fact that this substance is hazardous. Ammonia has a caustic effect on skin and mucous membranes (in particular on the eyes), and furthermore it forms an explosive mixture in air.

When the abovementioned urea solution is injected into the hot exhaust-gas flow, ammonia and carbon dioxide are formed from it through a decomposition reaction. The ammonia generated in this way is then available in the SCR catalytic converter arranged downstream. During the conversion of ammonia with the nitrogen oxides in the exhaust gas, a comproportionation reaction takes place, with water ($H_2O$) and nitrogen ($N_2$) being formed. With SCR catalytic converters, a distinction is typically made between two different types of catalytic converters. One type is composed substantially of titanium dioxide, vanadium pentoxide and tungsten oxide. The other type uses zeolites.

The amount of urea injected is dependent on the nitrogen oxide emissions of the engine and therefore on the present rotational speed and the torque of the engine. The consumption of urea-water solution amounts to approximately 2 to 8% of the diesel fuel used, depending on the untreated emissions of the engine. It is therefore necessary for a corresponding tank volume to be provided on board, which is in part perceived to be disadvantageous. In particular, this opposes the use in diesel-operated passenger motor vehicles, because an additional tank is provided.

Nitrogen oxides are removed from the exhaust gas to a great extent by means of selective catalytic reduction. In contrast to diesel particle filters (DPF), which are likewise known, or LNT (lean NOx trap) catalytic converters, there is no excess fuel consumption for the reduction of pollutants, because in contrast to the abovementioned catalytic converters, an SCR catalytic converter does not utilize any temporary deviation from optimum combustion conditions during operation.

When using SCR technology in utility vehicles, for example, the ammonia, in the form of AdBlue®, required for operation gives rise to further requirements. Owing to its particular properties, it may be carried on board as a further operating medium in a high-grade steel or plastic tank, and continuously injected into the exhaust-gas flow. As a result, aside from the SCR catalytic converter and the injection system, there is a need for a second, usually smaller tank aside from the diesel tank.

Furthermore, it may be noted that, during operation, AdBlue® may be injected in a variable fashion. Hitherto, the AdBlue® has been adapted to the NOx in the exhaust-gas mass flow by means of a so-called feed ratio. Here, if too much urea is dosed in, the ammonia formed from this can no longer react with NOx. In the event of such an incorrect dosing, ammonia can pass into the environment. Since ammonia is perceptible even in very small concentrations, this leads to an unpleasant smell.

It may be noted here that SCR catalytic converters are capable of adsorbing ammonia. As is the case in most adsorption and desorption processes, the adsorption of ammonia on the surface of the SCR catalytic converter material is also highly temperature-dependent. Accordingly, it is possible at relatively low exhaust-gas temperatures for relatively large quantities of ammonia to be adsorbed, which ammonia is desorbed again at higher temperatures if it has not in the meantime been consumed by means of the above-explained comproportionation reaction with nitrogen oxides.

The constantly changing operating conditions of an internal combustion engine have the effect that the exhaust-gas temperatures also constantly change during operation, and therefore the temperature of the SCR catalytic converter and, in turn, the ammonia adsorption capability thereof also constantly change. It is consequently difficult to dose in a quantity of reducing agent adequate to provide the required quantity of ammonia for all operating states of the internal combustion engine.

For example, the amount of reducing agent (e.g., ammonia) dosed to the SCR catalyst typically is based on a difference between a desired ammonia storage level and an estimated ammonia storage level, where the estimated amount of ammonia storage is determined based on catalyst temperature, catalyst age, ammonia concentration at the SCR inlet, etc. Such a mechanism for dosing the ammonia does not provide for quick response to rapidly changing exhaust conditions. As an example, if an accelerator tip-in occurs leading to an increase in exhaust gas temperature, by the time the temperature sensor has responded to the change in catalyst temperature, a significant amount of ammonia may be desorbed from the SCR, leading to ammonia slip.

The inventors herein have recognized the issues with the above approaches and provide a method to at least partly address them. In one example, a method for controlling an injection device for feeding an ammonia-releasing reducing agent into an exhaust-gas purification system of an internal combustion engine to reduce nitrogen oxide emissions, the exhaust-gas purification system comprising an SCR catalytic converter with n cells which are arranged in series in an exhaust-gas throughflow direction and in which ammonia is stored comprises determining a desired degree of ammonia loading at an exhaust-gas inlet temperature $T_0$ and determining an ammonia partial pressure in exhaust gas directly upstream of the SCR catalytic converter; determining an actual degree of ammonia loading of the SCR catalytic converter by adding each individual degree of ammonia loading of each cell i of all of the n cells of the SCR catalytic converter, the individual degree of ammonia loading of each cell i determined as a function of a temperature $T_i$ of the cell i and of an ammonia outlet partial pressure of a neighboring cell i−1 which is directly adjacent in an upstream direction; and determining a difference between the actual degree of ammonia loading and the desired degree of ammonia loading. If the actual degree of ammonia loading is less than the desired degree of ammonia loading, the amount of injected ammonia is increased, and if the actual degree of ammonia loading exceeds the desired degree of ammonia loading, the amount of injected ammonia is reduced.

In this way, the dynamics of ammonia storage/release in the SCR catalyst may be accounted for in order to maximize the NOx conversion and minimize the amount of ammonia slip using a one-dimensional model of the SCR catalyst. By dividing the SCR catalyst into a discrete number of cells, the ammonia loading at each cell may be determined rather than determining a single value for ammonia loading of the entire catalyst. Thus, the SCR catalyst model may account for temperature variations across the catalyst, such as those that may occur due to sudden acceleration or deceleration events.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
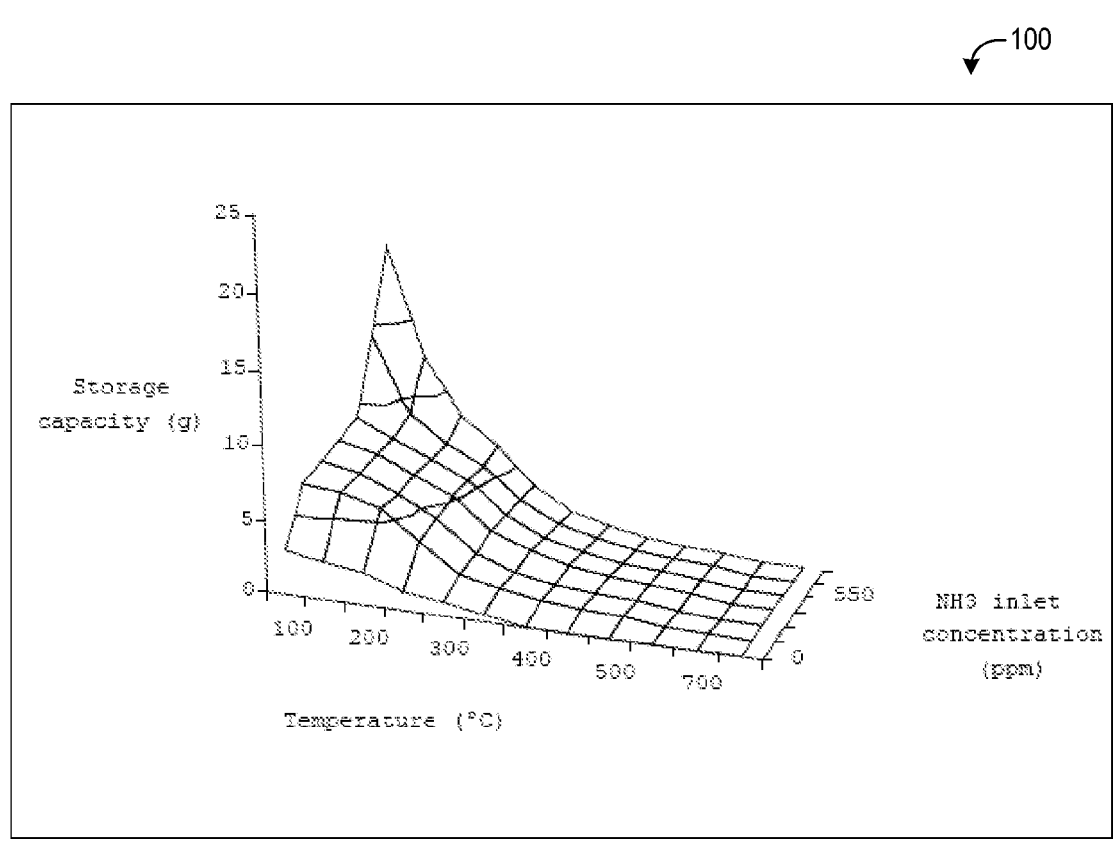
FIG. 1 is a surface diagram illustrating an example three-dimension value matrix for an SCR catalyst.

The present disclosure provides a method which makes it possible, for the changing operating conditions of an internal combustion engine, to as far as possible dose in an adequate quantity of reducing agent into the exhaust gases, wherein firstly as complete as possible an elimination of the nitrogen oxides should be attained without too high a quantity of reducing agent being dosed, which may lead to the undesired release of ammonia described in the introduction.

Said object is achieved by a method for controlling an injection device for feeding an ammonia-releasing reducing agent into an exhaust-gas purification system of an internal combustion engine for the purpose of reducing the nitrogen oxide emissions, wherein the exhaust-gas purification system comprises at least one SCR catalytic converter with n cells which are arranged in series in the exhaust-gas throughflow direction and in which ammonia can be stored, wherein the method comprises the following steps:

a. defining a desired degree of ammonia loading $\Theta_{NH_3,SCR}^{Ziel}$ at an exhaust-gas inlet temperature $T_0$ and defining an ammonia partial pressure $\rho_{NH_3,0}$ in the exhaust gas directly upstream of the SCR catalytic converter;

b. determining the actual degree of ammonia loading $\Theta_{NH_3,SCR}^{real}$ of the SCR catalytic converter by adding the individual degrees of ammonia loading $\Theta_{NH_3,i}$ of all of the cells i of the SCR catalytic converter as per the formula $$\Theta_{NH_3,SCR}^{real} = \sum_{i=1}^{n} \Theta_{NH_3,i},$$

where i is a natural number which denotes the individual cells of the SCR catalytic converter, said number increasing in the exhaust-gas flow direction, and wherein: $1 < i < n$, and wherein $\Theta_{NH_3,i}$ of each cell i is determined as a function of the temperature $T_i$ of the cell i and of the ammonia outlet partial pressure $\rho_{NH_3,i-1}$ of the neighboring cell i−1 which is directly adjacent in the upstream direction;

c. identifying whether a deviation of the actual degree of ammonia loading $\Theta_{NH_3,SCR}^{real}$ from the desired degree of ammonia loading $\Theta_{NH_3,SCR}^{Ziel}$ is present; wherein if i. the actual degree of ammonia loading $\Theta_{NH_3,SCR}^{real}$ falls below the desired degree of ammonia loading $\Theta_{NH_3,SCR}^{Ziel}$, a signal is transmitted to the injection device, which signal prompts the injection device to increase the ammonia infeed, ii. the actual degree of ammonia loading $\Theta_{NH_3,SCR}^{real}$ exceeds the desired degree of ammonia loading $\Theta_{NH_3,SCR}^{Ziel}$, a signal is transmitted to the injection device, which signal prompts the injection device to reduce the ammonia infeed.

In other words, the solution according to the disclosure provides that an SCR catalytic converter be divided into individual sections, and that it then be determined what the prevailing ammonia loading is in the respective section. For said determination, the ammonia partial pressure, that is to say the ammonia concentration, upstream of the respective cell and also the temperature prevailing in the respective cell is used. If, for the catalytic converter material used in the SCR catalytic converter, a prior determination is carried out with regard to the adsorption behavior thereof at different temperatures and ammonia partial pressures, it is possible in this way for the present degree of ammonia loading to be calculated for each of the stated sections. By adding the individual values, for all of the sections, of the degrees of loading of the cells thus determined, the overall degree of loading of the SCR catalytic converter is then determined.

If said calculated result does not correspond to a predefined target value, it is provided according to the disclosure that a signal be transmitted to the injection device for the reducing agent in order to correct the deviation. If the comparison of the values yields that the actual degree of ammonia loading is higher than the target value, there would, in the event of a further exceedance, be the risk of ammonia passing out of the exhaust tract into the environment. In this case, the signal serves to initiate a reduction of the reducing agent dosing. If, on the other hand, the actual degree of ammonia loading is lower than the target value, there is the risk of nitrogen oxides being discharged into the environment in the event of a further decrease in ammonia loading. The signal then serves to initiate an increase of the reducing agent dosing.

The target value of the degree of loading, that is to say the desired degree of loading, may be fixed or variable. In the latter case, it is for example possible to adapt the desired degree of loading as a function of the operating parameters of the internal combustion engine, for example as a function of the engine rotational speed, wherein the desired degree of loading can be increased at relatively high rotational speeds and can be reduced at relatively low rotational speeds.

The advantage of said method includes inter alia in the fact that an adequate ammonia "buffer" in the SCR catalytic converter is ensured at an early stage and continuously. By means of said ammonia buffer, in the event of spontaneous changes in exhaust-gas composition, for example in the event of hard acceleration of the vehicle, the rapid increase in nitrogen oxides can be captured without said nitrogen oxides passing out of the exhaust system.

In contrast to systems which are otherwise controlled exclusively by means of measurement sensors, it is possible in the system according to the disclosure for ammonia or nitrogen oxide to pass into the environment at a lower rate. This is based on the fact that, in the present case, the degree of loading, which is not readily accessible for measurement during operation, is calculated. Known systems therefore conventionally also register only partial pressures in the exhaust-gas flow itself, such that countermeasures to fast changes in exhaust-gas composition often cannot be implemented adequately quickly.

The injection device according to the disclosure may in principle be used in any type of exhaust-gas treatment systems having an SCR catalytic converter. It is possible, in a manner known per se, for further catalytic converters such as an LNT or a soot particle filter to be used in addition to the SCR catalytic converter.

In an advantageous embodiment of the method according to the disclosure, the reducing agent is an ammonia-releasing liquid, in particular an aqueous urea solution such as AdBlue®.

Within the context of the method according to the disclosure, it may be provided that the number of cells n of the SCR catalytic converter be set to 4, preferably to 12. In this way, it is possible to ensure adequate accuracy of the determination of the actual degree of loading, wherein at the same time the processing outlay can be kept within limits, such that the control is possible with an adequate rate of reaction.

It is furthermore preferable if the determination of the actual degree of ammonia loading $\Theta_{NH_3,SCR}^{real}$ takes place at least once per second, in particular at least two times per second.

In a further embodiment of the method according to the disclosure, the exhaust-gas inlet temperature $T_0$ directly upstream of the SCR catalytic converter, and if desired the exhaust-gas outlet temperature $T_{End}$ directly downstream of the SCR catalytic converter, are measured. In this way, the most precise possible values are obtained for the temperatures prevailing at the first and last cells and therefore also across the temperature gradient within the SCR catalytic converter.

Analogously to this, it may further be provided that the ammonia partial pressure $\rho_{NH_3,0}$ in the exhaust gas directly upstream of the SCR catalytic converter, and if desired the ammonia partial pressure $\rho_{NH_3,End}$ directly downstream of the SCR catalytic converter, are measured. In this case, too, the most precise possible values are correspondingly obtained for the ammonia partial pressures prevailing upstream of the first cell and downstream of the last cell and therefore also across the partial pressure gradient within the SCR catalytic converter. Since the system preferably operates such that the exhaust gas contains no ammonia downstream of the SCR catalytic converter, it is also possible to dispense with the downstream ammonia measurement.

The method according to the disclosure makes it possible for the injection device to be activated, in order to correspondingly adapt the dosing of the reducing agent, under certain preconditions. To avoid unnecessarily frequent interventions into said regulating loop and also to avoid possible oscillation of the regulating loop, it is advantageously the case that a signal is transmitted to the injection device only if the actual degree of ammonia loading $\Theta_{NH_3,SCR}^{real}$ deviates from the desired degree of ammonia loading $\Theta_{NH_3,SCR}^{Ziel}$ by at least 2%, in particular by at least 3%.

It likewise falls within the scope of the present disclosure for the actual degree of ammonia $\Theta_{NH_3,SCR}^{real}$ to be provided, before the comparison with the desired degree of ammonia loading $\Theta_{NH_3,SCR}^{Ziel}$, with a corrective factor. Said factor may for example be determined once in the case of a known system of a certain engine type and exhaust-gas treatment system with all of the components thereof, and then used for all vehicles with that combination.

In a particularly preferred embodiment of the method according to the disclosure, the actual degree of ammonia loading $\Theta_{NH_3,i}$ of each cell i is determined as a function of the temperature $T_i$ of the cell i and of the ammonia outlet partial pressure $\rho_{NH_3,i-1}$ of the neighboring cell i-1 which is directly adjacent in the upstream direction, in such a way that a three-dimensional value matrix is stored which contains, for the catalytic converter material used in the SCR catalytic converter, the degrees of ammonia loading as a function of the temperature and the ammonia partial pressure in the form $\Theta_{NH_3,SCR}=f(T),f(\rho_{NH_3})$, and from which the value for the actual degree of ammonia loading $\Theta_{NH_3,i}$ of the cell i at the temperature $T_i$ of the cell i and at the ammonia outlet partial pressure $\rho_{NH_3,i-1}$ is read out.

Here, the values of the degrees of ammonia loading may for example be stored in the three-dimensional value matrix over a temperature range from 100° C. to 800° C., in particular from 150° C. to 700° C. Here, it is possible in particular for at least one value of the degree of ammonia loading to be stored in the three-dimensional value matrix per 5° C., in particular one value per 1° C.

In the same way, the values of the degrees of ammonia loading may be stored in the three-dimensional value matrix over an ammonia partial pressure or ammonia concentration from 0 to 3000 ppm, in particular from 0 to 500 ppm. Here, the value interval may be selected such that at least one value of the degree of ammonia loading is stored in the three-dimensional value matrix per 20 ppm ammonia concentration, in particular one value per 10 ppm.

In a further preferred embodiment of the method according to the disclosure, the three-dimensional value matrix is established through prior measurement of the degrees of ammonia loading $\Theta_{NH_3,SCR}=f(T),f(\rho_{NH_3})$ on the basis of Langmuir isotherm or Brunauer-Emmet-Teller isotherm (BET isotherm). Said two abovementioned isotherms are known per se to a person skilled in the art, yield adequate accuracy, and can be implemented without great outlay in terms of apparatus.

A three-dimensional value matrix according to the disclosure is illustrated graphically as a surface diagram in FIG. 1. In said diagram, the degree of loading is plotted as an absolute loading in g(NH$_3$) as a function of the temperature T and the ammonia partial pressure, in the present case the ammonia concentration c(NH$_3$) in ppm. It can be clearly seen that the ammonia loading of the SCR catalytic converter decreases with rising temperature and falling ammonia partial pressure. Conversely, a high ammonia loading arises at low temperatures and high ammonia partial pressures.

A further subject matter of the present disclosure concerns a device for controlling an injection device for feeding an ammonia-releasing reducing agent into an exhaust-gas purification system of an internal combustion engine for the purpose of reducing the nitrogen oxide emissions, wherein the exhaust-gas purification system comprises at least one SCR catalytic converter with n cells which are arranged in series in the exhaust-gas throughflow direction and in which ammonia can be stored, wherein the device comprises a control device configured to carry out the method according to the disclosure. The control device may advantageously be connected to the injection device. The control device may be designed as an individual component or else may be part of the engine controller.

Figure 2:
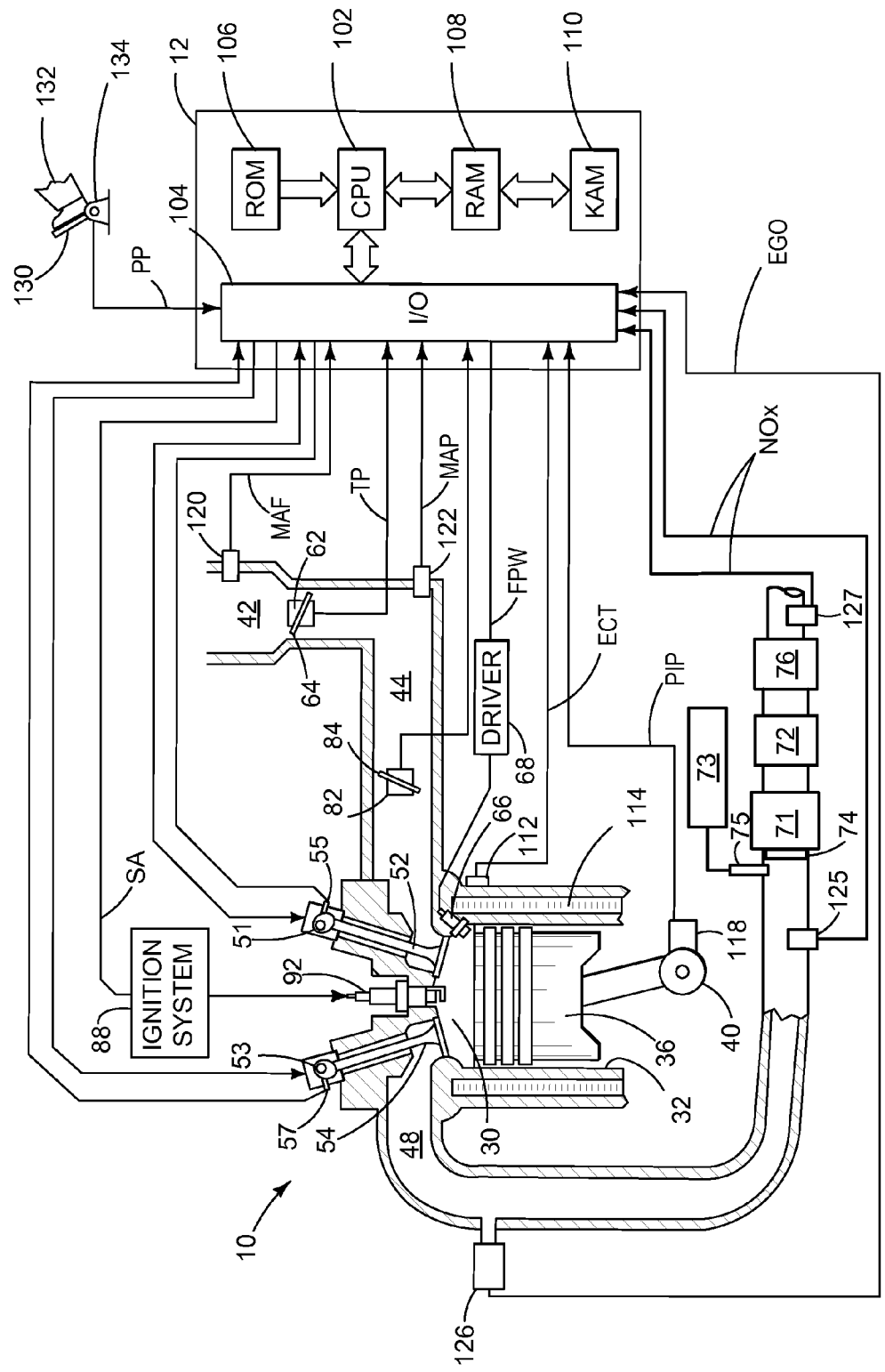
FIG. 2 is a schematic diagram of a single cylinder of a multi-cylinder engine.

Referring now to FIG. 2, it includes a schematic diagram showing one cylinder of multi-cylinder internal combustion engine 10 of FIG. 1. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 10 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion cylinder 30 for injecting fuel directly therein in proportion to the pulse width of signal FPW received from controller 12 via electronic driver 68. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. In some embodiments, combustion cylinder 30 may alternatively or additionally include a fuel injector arranged in intake passage 42 in a configuration that provides what is known as port injection of fuel into the intake port upstream of combustion cylinder 30.

Intake passage 42 may include a charge motion control valve (CMCV) 84 and a CMCV plate 82 and may also include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NO$_x$, HC, or CO sensor. A NOx sensor 125 may be provided upstream of emission control devices 71, 72, and 76. NOx sensor 125 may be configured to provide an indication of engine out NOx levels, e.g., NOx levels in the exhaust downstream of the engine and upstream of any emission control devices. Emission control devices 71, 72, and 76 are shown arranged along exhaust passage 48 downstream of exhaust gas sensor 126 and NOx sensor 125. In the depicted embodiment, device 71 may be a selective catalytic reduction (SCR) system, while devices 72 and 76 may be a diesel oxidation catalyst (DOC), diesel particulate filter (DPF), three way catalyst (TWC), NO$_x$ trap, various other emission control devices, or combinations thereof For example, device 72 may be a DOC and device 76 may be a DPF. In some embodiments, DPF 76 may be located downstream of SCR 71 and DOC 72 (as shown in FIG. 1), while in other embodiments, DPF 76 may be positioned upstream of DOC 72. Alternative arrangements are also possible in some embodiments, such as DOC 72 and/or DPF 76 being arranged upstream of SCR 71. If device 71 is an SCR system, a reductant tank 73 may be present to store reductant, such as urea or NH$_3$. The tank 73 may be coupled to an injector 75 to inject reductant into the exhaust upstream of the device 71 or into the device 71 in order to reduce NOx in the device 71. Further, a mixer 74 may be provided to ensure adequate mixing of the reductant within the exhaust stream. Ammonia may be injected in proportion to an amount of engine feedgas NOx entering the SCR. An additional NOx sensor 127 may be present downstream of the devices 71, 72 and 76 to provide an indication of the efficiency of the devices, by comparing the downstream NOx reading from sensor 127 to the upstream NOx reading from sensor 125. Sensor 127 may be located in other suitable locations, such as immediately downstream of device 71 and/or in device 71.

Controller 12 is shown in FIG. 2 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Storage medium read-only memory 106 can be programmed with computer readable data representing instructions executable by processor 102 for performing the methods described below as well as variations thereof.

Storage medium read-only memory 106 can be programmed with computer readable data representing instructions executable by processor 102 for performing the methods described below as well as other variants that are anticipated but not specifically listed.

As described above, FIG. 2 shows only one cylinder of a multi-cylinder engine, and that each cylinder may similarly include its own set of intake/exhaust valves, fuel injector, spark plug, etc.

Figure 3:
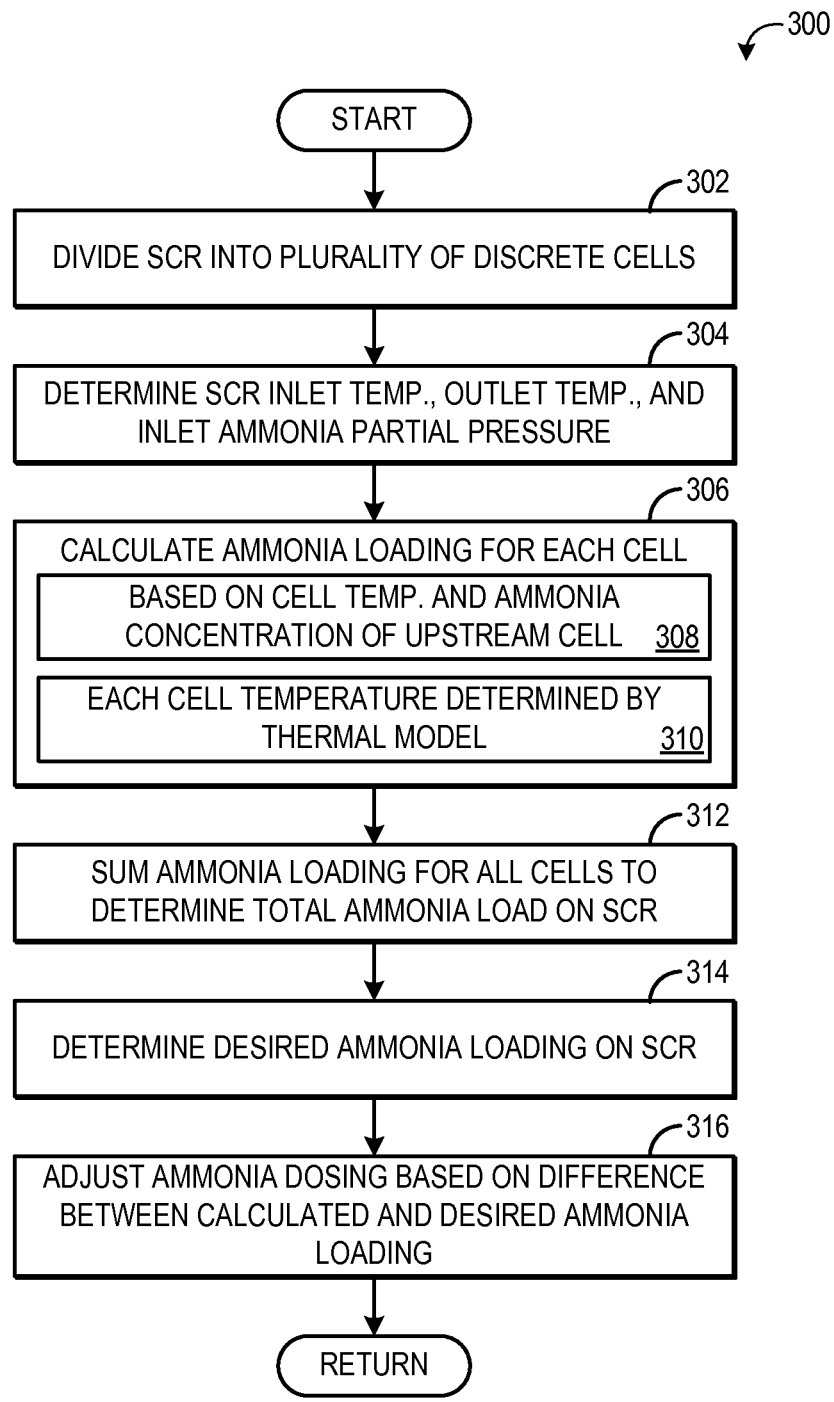
FIG. 3 is a flow chart illustrating a method for adjusting a reductant injection amount according to an embodiment of the present disclosure.

Turning now to FIG. 3, a method 300 for adjusting reductant dosage is illustrated. Method 300 may be carried by an engine controller, such as controller 12 of FIG. 2, in order to adjust the amount of reductant injected into an SCR catalyst. Method 300 utilizes a kinetic model that calculates ammonia loading on each cell of a plurality of discrete cells across the SCR catalyst. By determining the amount of stored ammonia for each cell in the SCR catalyst rather than simply determining the ammonia storage for the entire device, changes to the temperature of the SCR catalyst, which may start at the inlet of the SCR catalyst and propagate across it, may be better accounted for.

At 302, method 300 includes dividing the SCR catalyst into a plurality of discrete cells. The SCR catalyst may be divided into a suitable number of cells, such as 4, 8, 12, etc, in the axial direction. Each cell may be approximately equal in volume, or the cells may have variable volumes. At 304, the SCR inlet temperature, outlet temperature, and inlet ammonia partial pressure are determined. Further, in some embodiments, the SCR outlet ammonia partial pressure may also be determined. The SCR inlet and outlet temperatures may be determined from temperature sensors located upstream and downstream of the SCR catalyst. The inlet ammonia partial pressure may be determined from output received from an exhaust gas sensor upstream of the SCR catalyst, such as a NOx sensor. However, the ammonia partial pressure may also be estimated based on the amount of ammonia injected by the SCR injection device, exhaust mass flow, exhaust temperature, etc.

At 306, the ammonia loading is determined for each cell. The ammonia loading on each cell may be the amount of ammonia that is stored in the SCR catalyst at each cell. The ammonia loading may also include the amount of ammonia in the exhaust gas (e.g., non-stored ammonia) traveling through each cell. The ammonia loading for a given cell may be determined based on the temperature of that cell and the ammonia partial pressure of the upstream cell, as indicated at 308. For the first cell of the SCR catalyst, the ammonia loading may be determined based on the inlet SCR temperature and partial pressure at the inlet of the SCR. For each subsequent cell, the cell temperature may be determined based on a thermal model, as indicated at 310. For example, a differential between the SCR inlet and outlet temperatures, mass flow of the exhaust, and space velocity of the SCR catalyst may be used to determine the temperature of each cell in the SCR catalyst. Further, in some embodiments, the distance of each cell from the injection device that injects ammonia to the SCR catalyst may be used to determine the ammonia loading of each cell. For example, the closer a cell is located to the injector, the more likely the cell will store ammonia compared to a cell that is located further from the injector, as some or all the ammonia may be stored/converted in upstream cells before reaching downstream cells. Thus, the further a cell is from the injector, the less ammonia may be present in the exhaust traveling through that cell.

At 312, the total ammonia loading on the entire SCR catalyst is determined by summing the ammonia loading of each of the plurality of cells. At 314, a desired amount of ammonia loading is determined. The desired amount of ammonia loading may be the amount of ammonia desired in the SCR to covert substantially all the NOx in the exhaust, without releasing excess ammonia to atmosphere. The desired ammonia loading may be a function of SCR temperature, SCR age, space velocity, and level of NOx at the inlet of the SCR catalyst. In some embodiments, the desired amount of ammonia loading may be calculated for each cell of the plurality of cells.

At 316, the ammonia dosing of the injection device is adjusted based on the difference between the desired and estimated ammonia loading. For example, if the desired amount of ammonia is greater than the estimated amount, the amount of ammonia injected into the SCR catalyst may be increased. If the desired amount of ammonia is less than the estimated amount, the amount of ammonia injected by the injection device may be decreased.

Thus, method 300 provides for a method for a selective catalytic reduction (SCR) device, comprising adjusting an amount of ammonia injected to the SCR catalyst based on a difference between a desired ammonia storage amount and an estimated ammonia storage amount, the estimated ammonia storage amount comprising a sum of cell ammonia storage amounts for each cell of a plurality of cells of the SCR catalyst, each cell ammonia storage amount based on a temperature of that cell and an ammonia concentration of an upstream cell.

The configuration of the present disclosure, as described with respect to method 300 of FIG. 3, provides for dividing the SCR catalyst into a discrete number of cells in the axial direction. A simplified kinetics model is then used to calculate the level of stored ammonia in the individual cells. The kinetics model may be coupled to a thermal model of higher order. In doing so, the desired ammonia storage is extended to an array of values for the respective discrete cells. This may maximize NOx conversion in the SCR while minimizing ammonia slip.

In one example, the desired storage in an [i] cell may be scheduled as a function of the [i] cell temperature as well as inlet ammonia concentration to that specific cell as calculated from the [i−1] cell. Moreover, a predictive approach can be used whereby the [i] cell storage is not only a function of the [i] cell temperature but also a function of the temperature array for the cells [1, . . . , i−1, i, i+1, . . . , n) for a total number of discrete [n] cells. Further, the dependency on the space velocity can be accounted for. In this case, a thermal wave propagating across the SCR catalyst (due to a sudden heating of the front face associated with an acceleration, or alternatively due to a sudden cooling associated with a deceleration, for example) can be accounted for by decreasing the storage in the subsequent cells for the case of higher temperatures in the front face (prior cells). The total desired ammonia storage is then calculated as the summation of the individual cell contributions [i:1,2, n−1,n] and the dosing quantity is adjusted as a function of the deviation between the desired ammonia storage and the estimated storage level (summed over all cells) in the SCR catalyst.

The ammonia storage model may also permit increased accuracy in determining whether a NOx sensor is reading NOx or ammonia. For example, an exhaust sensor downstream of the SCR catalyst, such as sensor 127, may be configured to output a reading indicative of either NOx or ammonia in the exhaust. Typically, determination of whether the sensor is reading NOx or ammonia is estimated based on the estimated ammonia storage level in the SCR catalyst as well as other parameters (e.g., if ammonia storage is high, it may be assumed that the NOx sensor is reading ammonia, particularly if exhaust temperature is high). By determining the ammonia loading at each cell of the SCR catalyst, overall accuracy of ammonia storage determination may be increased, thus increasing the accuracy of the NOx sensor output. This may be particularly beneficial if the NOx sensor is located on the SCR catalyst, such as at catalyst midbed. In this way, the ammonia storage of the cells upstream of the NOx sensor may be used to determine the ammonia storage and hence whether the sensor is reading NOx or ammonia, instead of relying on a determination of the ammonia storage of the entire catalyst.

As described above, a sudden acceleration, or tip-in event, may cause an increase in temperature at the inlet of the SCR catalyst. The thermal model described above may be used to predict how the temperature wave propagates across the SCR catalyst in and through each cell. As the temperature of the SCR catalyst increases, the amount of ammonia stored in the SCR catalyst may decrease, leading to ammonia slip, which can be modeled on a cell-by-cell basis. Thus, a predicted amount of ammonia release may be determined, and the amount of injected ammonia may be adjusted based on the predicted ammonia release.

Thus, in one example, a method for an SCR catalyst comprises, responsive to a pedal tip-in event, reducing ammonia injected to the SCR catalyst by an amount determined from a predicted SCR ammonia release resulting from the tip-in event, the predicted SCR ammonia release based on a sum of cell ammonia storage amounts for each cell of a plurality of cells of the SCR catalyst, each cell ammonia storage amount based on a temperature of that cell and an ammonia concentration of an upstream cell. In some examples, during a tip-out event, the amount of injected ammonia may be increased depending on the relative storage levels of each of the cells in the SCR catalyst. In this case, the amount of predicted released ammonia may change to an amount of predicted stored ammonia, as the temperature decrease may result in additional ammonia being stored in the catalyst.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an injection device for feeding an ammonia-releasing reducing agent into an exhaust-gas purification system of an internal combustion engine to reduce nitrogen oxide emissions, the exhaust-gas purification system comprising an SCR catalytic converter with n cells which are arranged in series in an exhaust-gas throughflow direction and in which ammonia is stored, the method comprising:

determining a desired degree of ammonia loading at an exhaust-gas inlet temperature $T_0$ and determining an ammonia partial pressure in an exhaust gas directly upstream of the SCR catalytic converter;

determining an actual degree of ammonia loading of the SCR catalytic converter by adding each individual degree of ammonia loading of each cell i of all of the n cells of the SCR catalytic converter, the individual degree of ammonia loading of each cell i determined as a function of a temperature $T_i$ of the cell i and of an ammonia outlet partial pressure of a neighboring cell i−1 which is directly adjacent in an upstream direction;

determining a difference between the actual degree of ammonia loading and the desired degree of ammonia loading;

if the actual degree of ammonia loading is less than the desired degree of ammonia loading, increasing an amount of injected ammonia; and if the actual degree of ammonia loading exceeds the desired degree of ammonia loading, reducing the amount of injected ammonia.

2. The method as claimed in claim 1, wherein a number of cells n of the SCR catalytic converter is set to at least 4.

3. The method as claimed in claim 1, wherein the exhaust-gas inlet temperature $T_0$ directly upstream of the SCR catalytic converter and an exhaust-gas outlet temperature $T_{End}$ directly downstream of the SCR catalytic converter are measured.

4. The method as claimed in claim 1, wherein ammonia partial pressure in the exhaust gas directly upstream of the SCR catalytic converter and ammonia partial pressure directly downstream of the SCR catalytic converter are measured.

5. The method as claimed in claim 1, wherein the amount of injected ammonia is adjusted only if the actual degree of ammonia loading deviates from the desired degree of ammonia loading by at least 2%.

6. The method as claimed in claim 1, wherein the actual degree of ammonia loading is provided, before comparison with the desired degree of ammonia loading, with a corrective factor.

7. The method as claimed in claim 1, wherein the actual degree of ammonia loading of each cell i is determined as a function of the temperature $T_i$ of the cell i and of the ammonia outlet partial pressure of the neighboring cell i−1 which is directly adjacent in the upstream direction, in such a way that a three-dimensional value matrix is stored which contains, for catalytic converter material used in the SCR catalytic converter, the degrees of ammonia loading as a function of the temperature and the ammonia partial pressure, and from which a value for the actual degree of ammonia loading of the cell i at the temperature $T_i$ of the cell i and at the ammonia outlet partial pressure is read out.

8. The method as claimed in claim 7, wherein values of the degrees of ammonia loading are stored in the three-dimensional value matrix over a temperature range from 100° C. to 800° C.

9. The method as claimed in claim 8, wherein at least one value of the degree of ammonia loading is stored in the three-dimensional value matrix per 5° C.

10. The method as claimed in claim 9, wherein the values of the degrees of ammonia loading are stored in the three-dimensional value matrix over an ammonia partial pressure or ammonia concentration from 0 to 3000 ppm.

11. The method as claimed in claim 10, wherein at least one value of the degree of ammonia loading is stored in the three-dimensional value matrix per 20 ppm ammonia concentration.

12. The method as claimed in claim 7, wherein the three-dimensional value matrix is established through prior measurement of the degrees of ammonia loading based on Langmuir isotherm or Brunauer-Emmet-Teller isotherm.

13. The method as claimed in claim 1, wherein the determination of the actual degree of ammonia loading takes place at least once per second.

14. A method for a selective catalytic reduction (SCR) device, comprising:

adjusting an amount of ammonia injected to the SCR device based on a difference between a desired ammonia storage amount and an estimated ammonia storage amount, the estimated ammonia storage amount comprising a sum of cell ammonia storage amounts for each cell of a plurality of cells of the SCR device, each cell ammonia storage amount based on a temperature of that cell and an ammonia concentration of an upstream cell.

15. The method of claim 14, wherein the SCR device is divided into the plurality of cells in an axial direction.

16. The method of claim 14, wherein each cell of the plurality of cells is equal in volume.

17. A method for an SCR catalyst, comprising:

responsive to a pedal tip-in event, reducing ammonia injected to the SCR catalyst by an amount determined from a predicted SCR ammonia release resulting from the tip-in event, the predicted SCR ammonia release based on a sum of cell ammonia storage amounts for each cell of a plurality of cells of the SCR catalyst, each cell ammonia storage amount based on a temperature of that cell and an ammonia concentration of an upstream cell.

18. The method of claim 17, wherein a temperature of each cell is determined based on a temperature differential across the SCR catalyst, mass air flow, and space velocity of the SCR catalyst.

19. The method of claim 17, further comprising, responsive to a pedal tip-out event, increasing ammonia injected to the SCR catalyst.

20. The method of claim 17, further comprising adjusting the ammonia injected to the SCR catalyst based on an amount of ammonia downstream of the SCR catalyst.

\* \* \* \* \*